United States Patent [19]

ope et al.

[11] Patent Number: 4,861,690
[45] Date of Patent: Aug. 29, 1989

[54] LIGHTWEIGHT BATTERY CONSTRUCTION

[76] Inventors: Henry F. Hope; Stephen F. Hope, both of c/o Hope Industries, Inc., 5701 Moreland Rd., Willow Grove, Pa. 19090

[21] Appl. No.: 202,457

[22] Filed: Jun. 6, 1988

[51] Int. Cl.$^4$ .................... H01M 4/64; H01M 4/66
[52] U.S. Cl. ........................... 429/233; 429/232; 429/245
[58] Field of Search ............... 429/194, 232, 233, 245

[56] References Cited

U.S. PATENT DOCUMENTS

| | | | |
|---|---|---|---|
| 3,485,677 | 12/1969 | Balanguer | 429/233 X |
| 4,275,130 | 6/1981 | Rippel et al. | 429/210 X |
| 4,304,825 | 12/1981 | Basu | 429/112 X |
| 4,707,423 | 11/1987 | Kalnin et al. | 429/194 X |

Primary Examiner—Stephen J. Kalafut
Attorney, Agent, or Firm—Z. T. Wobensmith

[57] ABSTRACT

Lightweight batteries which have electrodes that include a base current collector and carrier of carbon fiber material.

3 Claims, 1 Drawing Sheet

LIGHTWEIGHT BATTERY CONSTRUCTION

BACKGROUND OF THE INVENTION

1. Field of the Invention

This invention is directed to lightweight battery constructions where the current collector and carrier of the electrodes is of carbon fibre material.

2. Description of the Prior Art

The desirability of decreasing the weight and increasing the efficiency of batteries has long been a goal of battery designers. In obtaining that goal many considerations are involved, such as light weight, strength, current carrying capability and the lack of reactance with the active materials that form the battery. In lead-acid batteries, for example, a typical automotive battery can weigh 21.3 kilograms, with the current collector and carriers accounting for 5 kilograms or 23.5% of the total weight. The grids which make up the plates or electrodes of a typical lead acid battery, are usually of mesh configuration, and cast of lead and an alloy such as antimony. The finished grids have a paste of a lead oxide (in powdered form) and dilute sulfuric acid applied thereto which is then dried to form finished plates.

The finished grids serve both as a support for the active material on the plates and conduct the electric current. The grids also help to maintain uniform current distribution throughout the mass of active material.

The grids are subjected to considerable stress during charging and recharging which can result in their buckling, or separating from the pasted active material, resulting in a loss of efficiency and shortened service life.

It is highly important that the grids be free from inpurities which is often difficult to accomplish and which reduces efficiency of the battery due to improper banding or reactance with the active material.

Other batteries such as alkaline metal or alkaline earth metal batteries are in wide use and are desired for many applications.

As is known, while alkaline metals and alkaline earth metals are highly reactive, they are particularly suitable for use in batteries due to their ionic and electrical properties.

Of the alkaline metal or alkaline earth metals, lithium has been found particularly suitable for incorporation into batteries, but due to its inherent characteristics, lithium requires careful handling and special application treatment.

The alkaline metal or alkaline earth metals used are usually bounded or coated onto current collecting and carrying bases of metal foil such as copper, nickel or aluminum. The alkaline metals used include lithium, sodium, potassium and cesium with lithium being the material of choice. The alkaline earth metals would include beryllium, magnesium, calcium, strontium and barium. It has been observed that while alkaline metals, such as lithium, may initially appear to not react with copper or other metal foil bases, over a period of time the alkaline metals often react unfavorably with the metal foil base, and form an alloy with the metal, which results in decreased efficiency and a shorter than desired shelf and/or service life. It is important that the metal foil be free from impurities but this is difficult to accomplish and it has been found that the alkaline metal may react with even very minute amounts of impurities associated with the foil and which are difficult to remove.

It should also be noted that the base metal foils in alkaline batteries account for even more of the total battery weight than lead acid batteries and as much as 50% of the total battery weight. Weight reduction is desirable and will increase the energy density and reduce the cost of the battery. Examples of prior art alkaline or alkaline earth metal electrochemical cells, batteries and components are described in the article by Hooper, et al. in Advanced Battery Development, Odense University Press, 1984 and in the U.S. Patents to Andre et al., No. 4,357,401, Bannister, No. 4,471,037, Sugiuchi et al., No. 4,496,638, Skotheim, No. 4,520,086, and Hope, et al., No. 4,576,883.

The current collector and carrier of the invention provides batteries that do not suffer from the disadvantages of prior art batteries, and which provide many positive advantages.

SUMMARY OF THE INVENTION

It has been found that the use of inert carbon fibre material in current collectors and carriers for electrodes of batteries, provides durable batteries with a longer shelf and operating life, reduces the cost and weight of the batteries, improves the strength of the collectors, permits greater flexibility in manufacturing such batteries, and provides other benefits.

The principal object of the invention is to provide batteries wherein the current collectors and carriers are non reactive with the active materials in the battery.

A further object of the invention is to provide batteries which are of reduced weight and increased energy density.

A further object of the invention is to provide batteries that are easy to manufacture and form into desired configurations.

A further object of the invention is to provide batteries that have current collectors and carries which provide greater efficiency and capacity.

A further object of the invention is to provide batteries that have both a long shelf and a long operating life.

A further object of the invention is to provide batteries in which the current collectors and carriers may be dip coated.

A further object of the invention is to provide batteries which have current collectors and carriers of low resistance.

A further object of the invention is to provide batteries that have improved structural durability.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

DESCRIPTION OF THE PREFERRED EMBODIMENTS

A typical lead acid storage battery consists of an outer case impervious to liquid which contains a series of positive and negative plates or electrodes, with separators between the plates and which is filled with diluted sulfuric acid.

The plates are connected together in like groups and to positive and negative terminals for use.

Figure 1:
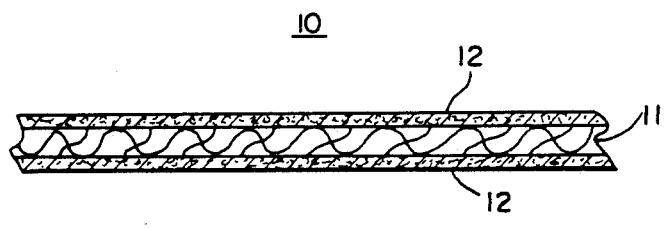
FIG. 1 is a diagrammatic view of an embodiment of the electrode construction in accordance with the invention for a typical lead-acid battery.

Referring now more particularly to the drawings and FIG. 1 thereof a plate or electrode 10 for use in a typical lead acid storage battery constructed in accordance with the invention is therein illustrated.

The plate 10 which may be a positive or negative plate, includes a grid 11, which is a current collector and carrier, and acts to support the active material 12 which is on both sides of the grid 11.

The grid 11, as illustrated is an open mesh of woven fibres of well known type, which material is substantially free from impurities and may have a resistance as low as 700 ohms.

The use of carbon or graphite fibre material provides a base that is both light in weight and of great tensile strength.

While the grid 11 is illustrated of mesh configuration, a solid ribbon of carbon fibre material, (not shown) can also be used for the grid, if desired.

To form the plate or electrode 10, a grid 11 of carbon fibre material which can be in pieces or in continuous lengths, as desired, has a paste of lead oxide and dilute sulfuric acid applied thereto, which is then dried. The resultant plate 10 has increased strength and resistance to warping and separation. Examples of paste compositions and their application are described in the publication by Karl Koresch, entitled "Batteries, lead-acid batteries and electric vehicles", c 1977, published by Marcel Dekker, Inc., New York, New York.

Pure carbon, or carbon of 99.9% purity, with low resistance, is an ideal current collecting and carrying material, which is quite suitable for continuous mass production of batteries, with very little likelihood of operational failure, and has a long shelf life since there is no short or long term reactance between it and the active materials of the battery. It should also be noted that graphite fiber, which is a form of carbon suited for electrical use can be used if desired. The resultant plate 10 may be used as a positive or negative electrode as desired and as dictated by the composition of the paste.

Figure 2:
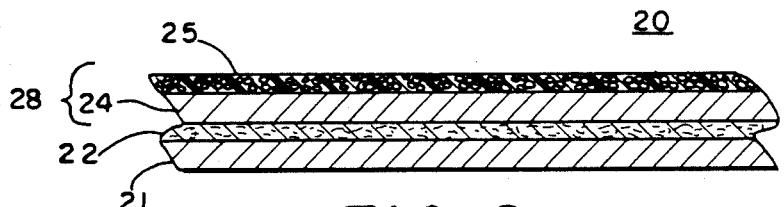
FIG. 2 is a diagrammatic view of another embodiment of a current collector and carrier of an alkaline battery constructed in accordance with the invention.

Referring now more particularly to FIG. 2 of the drawings, a typical solid state battery 20 is illustrated, constructed in accordance with the invention.

Solid state batteries such as alkaline metal or alkaline earth metal batteries, and for example lithium batteries, consist of at least an anode or negative electrode, a polymer dielectric layer, and a cathode or positive electrode. Such batteries can be of virtually any desired size and configuration, and usually include additional layers such as current conducting backing layers, insulating layers and connection layers.

For purposes of illustration the battery 20 to be described is of lithium metal construction but other alkaline metals or alkaline earth metals can be used if desired. The battery 20 includes a base 21 which acts as a current collector and carrier for the battery.

The base 21 as illustrated is a solid ribbon of carbon fibres of well known type as described for FIG. 1.

To form the battery 10 the base 21 may be dipped into a tank (not shown) which contains an alkaline earth metal or an alkaline metal such as lithium (not shown) in molten form.

The molten lithium in the tank (not shown) surrounds and coats the base 21 to form a layer 22 which provides maximum surface contact area which greatly improves performance and capacity. Because of the configuration of the base 21 ribbon, it may be coated by the well known wave soldering method, but spraying or other coating methods may also be used if desired. It should be noted that while the base 21 is illustrated in ribbon-like form, of indefinite length, that any desired configuration such as an open mesh, can be provided if desired. Additionally, graphite fibre in mesh or solid ribbon form can be used as described above. The base 21 may have a layer 24 of polymeric electrolyte composition applied thereto, which composition may be of polymeric material such as polyethylene oxide compounded with lithium salt and as is more fully described in our prior U.S. Pat. No. 4,576,883. The electrolyte mixture may be applied to the base 21 to form the layer 24 by any one of a number of suitable techniques, such as the well known doctor blade or extruding techniques.

A layer 25 of cathode material is applied on top of layer 24, which may be a thin layer of polymer spheres, which have encapsulated finely ground particles of an intercalation compound such as a vanadium oxide compound like ($V_6O_{13}$,) to which an organic solvent and carbon black were added to improve the electrical conductivity. The resultant cathode provides a second collector 28. The resultant basic battery 20 may then have additional layers such as current conducting backing connection, and insulating layers (not shown) applied thereto to form a complete battery.

It should be noted that while the current collector and carrier has been described for use in the anode of an alkaline battery, that the current collector and carrier will function in a cathode equally well.

The base 21 may also be inverted and additional layers as described above applied thereto, (not shown) to form a double battery, using but one base 21 as a current collector and carrier, thus saving 50% of the collector material.

It will thus be seen that structures have been provided with which the objects of the invention are achieved.

What is claimed is:

1. In an electric battery which includes a positive electrode, a negative electrode, and an electrolyte wherein at least one of the electrodes comprises
   a current collector and carrier of carbon fibre material, and
   a coating of alkaline earth metal on said current collector and carrier.
2. A battery as defined in claim 1 in which said electrode is an anode.
3. A battery as defined in claim 1 in which said electrode is a cathode and additionally includes a cathode active material.

* * * * *